April 27, 1926. 1,582,222
V. PLANER
DEVICE FOR MEASURING VALUES OF RESISTANCE OF CABLES AND CONDUCTORS
Filed Nov. 27, 1922 4 Sheets-Sheet 1

Inventor
Victor Planer
By Wilbur Owen
Attorney

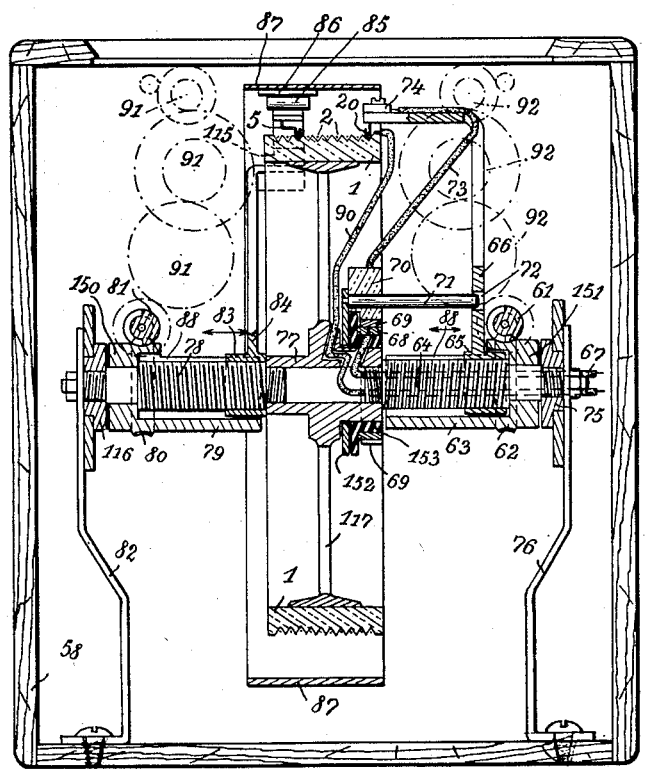
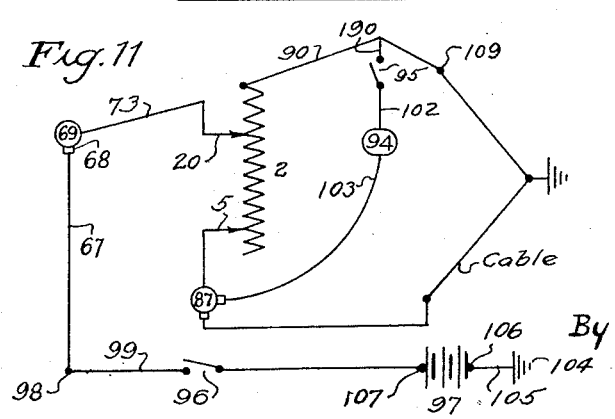

April 27, 1926.

V. PLANER 1,582,222

DEVICE FOR MEASURING VALUES OF RESISTANCE OF CABLES AND CONDUCTORS

Filed Nov. 27, 1922    4 Sheets-Sheet 3

Inventor
Victor Planer

By Wilber Owen

Attorney

April 27, 1926.  
V. PLANER  
1,582,222  
DEVICE FOR MEASURING VALUES OF RESISTANCE OF CABLES AND CONDUCTORS  
Filed Nov. 27, 1922  4 Sheets-Sheet 4
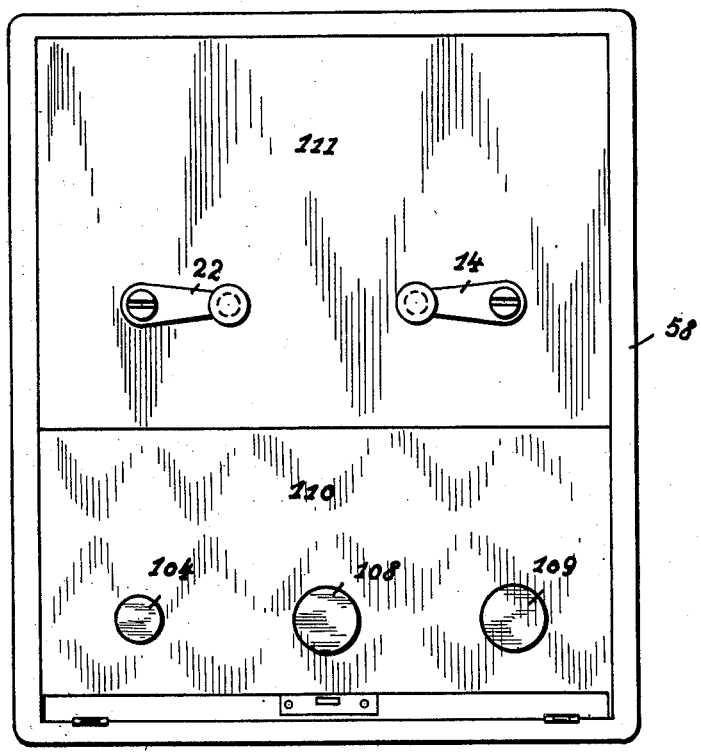
Fig. 7.
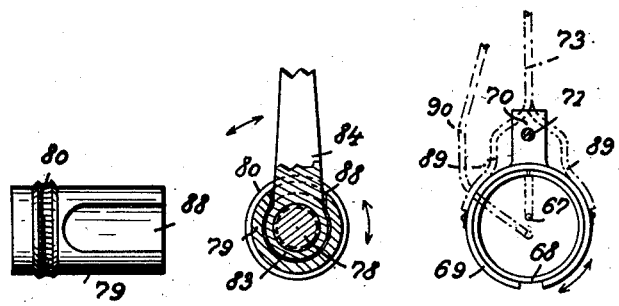
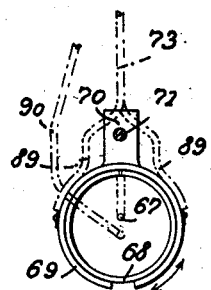
Fig. 8.  Fig. 9.  Fig. 10.
Inventor
Victor Planer
By  Wilber Owen
Attorney Patented Apr. 27, 1926.

1,582,222

UNITED STATES PATENT OFFICE.

VICTOR PLANER, OF BERLIN-LANKWITZ, GERMANY.

DEVICE FOR MEASURING VALUES OF RESISTANCE OF CABLES AND CONDUCTORS.

Application filed November 27, 1922. Serial No. 603,705.

*To all whom it may concern:*

Be it known that I, VICTOR PLANER, a citizen of the State of Hungary, residing at 22 Calandrellistrasse, Berlin-Lankwitz, Germany, have invented certain new and useful Improvements in Devices for Measuring Values of Resistance of Cables and Conductors, of which the following is a specification.

The invention relates to a device for locating faults, employing the principle of the Wheatstone bridge.

A method in use for locating faults by employing the principle of the Wheatstone bridge is to connect a resistance element to the two ends of the conductor to be tested. If the conductor is to be tested for a ground, a contact movable along the resistance element is connected to a grounded conductor, and the ends of the resistance are connected by another conductor. A source of electricity, such as a battery, is interposed in one of these last named conductors and a galvanometer in the other of them. When the movable contact is positioned so that the galvanometer will indicate zero current, the two ends of the resistance, between the movable contact and the connections to the conductor to be tested, will be proportional to the respective ends of said conductor between the place where it is grounded and the points of connection to the resistance. By proper mathematical calculations the distance of the break in the conductor from the end thereof may be calculated from the position of the movable contact on the resistance element.

The purpose of this invention is to devise an apparatus, by means of which the distance of the fault in the conductor may be determined directly from an indicator mechanically connected to the movable contact without the necessity of any mathematical calculations.

Figure 1:
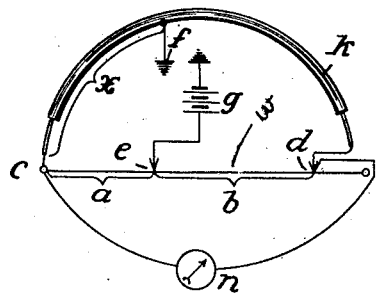
Figure 2:
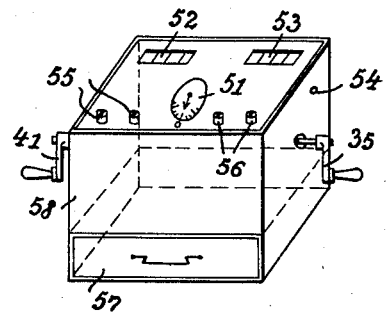
Figure 3:
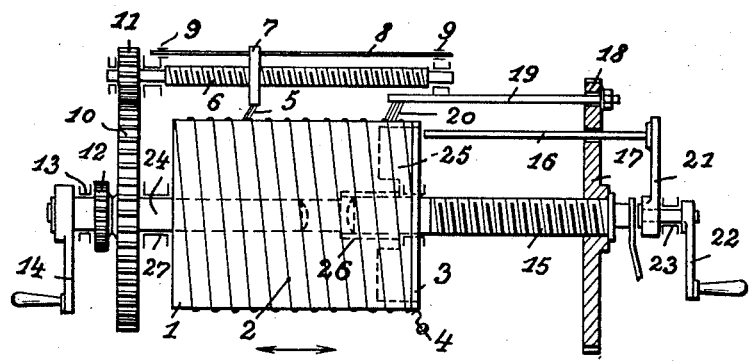
Figure 4:
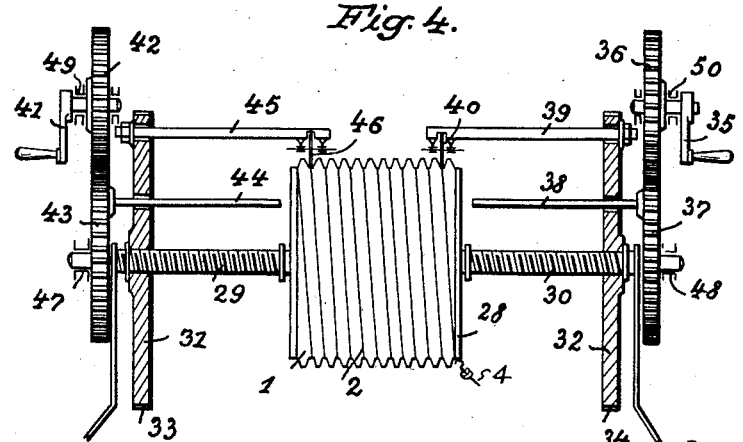
Figure 6:
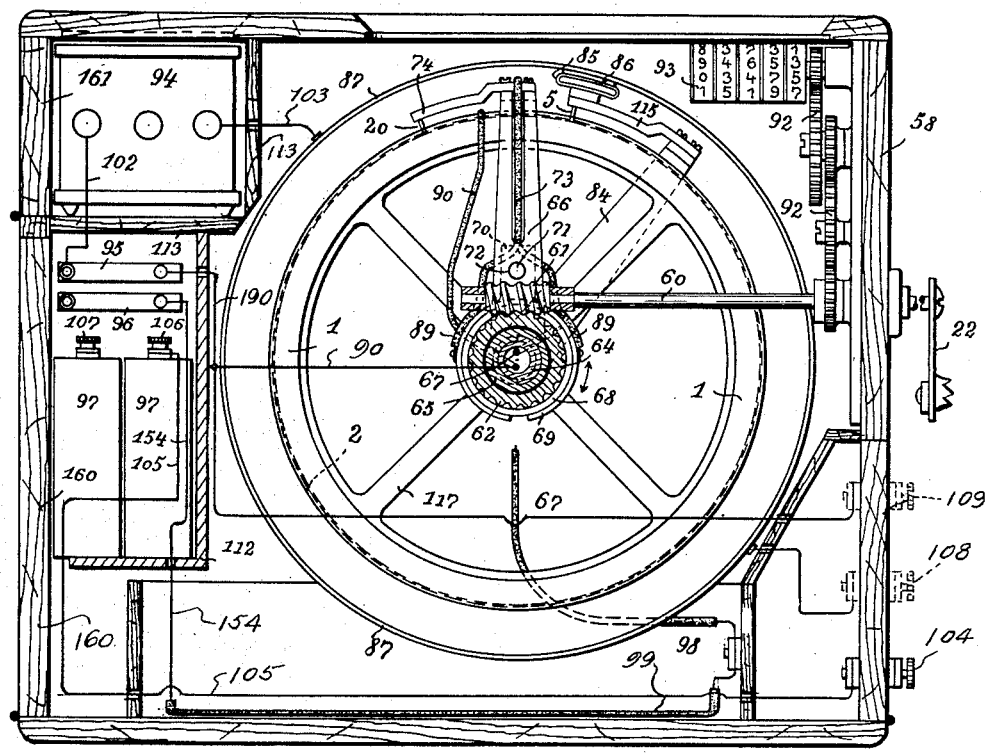

Figure 1 is a diagrammatic illustration of the theory of operation of the apparatus; Fig. 2 is a perspective view of one form of housing for the apparatus; Figures 3 and 4 are somewhat diagrammatic illustrations of forms of apparatus suitable for use in the housing shown in Fig. 2; Fig. 5 is a vertical section through the axis of the drum of the preferred form of apparatus; Fig. 6 is a vertical section taken at right angles to the section shown in Fig. 5; Fig. 7 is a view of the right end of the housing shown in Fig. 6; Figs. 8, 9 and 10 are detail views of portions of the preferred form of apparatus. Fig. 11 is a diagrammatic view showing the electrical connections for the device shown in Figs. 5 to 10.

The principle of the invention is shown in Figure 1, wherein $k$ denotes the cable having a fault at the point $f$, and $w$ denotes a resistance wire, the initial point $c$ of which is fixedly connected to the initial end of the cable by means of a clamp and to apparatus $n$ for the indication of zero-current, the device shown being a galvanometer. A movable contact, $d$, is connected with the other end of the cable and with it is fixedly joined up, also, the other terminal of the zero-current indicator $n$. To a second movable contact $e$, the current-source $g$, which in the example, is a battery, is fixedly connected, while its other pole is grounded. The movable contacts $d$ and $e$ are connected by appropriate mechanism to indicating devices, the indications of which are changed automatically in accordance with the movements of the contacts toward or away from the point $c$. These indicating devices are so arranged that they indicate the same number of units per unit of distance from the point $c$. For example, the indicators may be arranged to indicate one meter for each centimeter that their respective contacts are distant from the point $c$. The one movable contact $d$ is, then, moved until the indicator connected with it indicates in meters the length of the cable which is to be tested. This may at once be done, since the length of the cable, which is connected with the two terminals, is known. The other contact $e$ is then moved until the galvanometer indicates zero, whereupon the number of meters indicated by the indicator connected with the contact $e$ will be the number of meters that the fault $f$ is distant from the point $c$. This results from the well known principle of the Wheatstone bridge. For example, if $l$ equals the entire length of the conductor $k$, $x$ equals the length of the conductor between the fault $f$ and the point $c$, $a$ equals the distance between the point $c$ and the movable contact $e$, and $b$ equals the distance between the movable contacts $e$ and $d$; then, in accordance with the well known principle, $a:x::a+b:1$. But the contact $d$ has been moved until $a+b$ is to 1 as one centimeter is to a meter. Therefore, $a$ is to $x$ as one centimeter is to a meter and the indicator connected with the movable contact $e$ reads one meter for each centimeter in $a$, and therefore gives directly the length $x$. It is obvious that the same principle would apply whatever length of resistance wire is used to correspond with a unit in length of cable, or whatever unit of length is used. The principle and the proportion holds good whether the units indicated by the indicators be read meters, yards, feet, inches, rods, or any other units of measure desired.

Figure 2 shows a box or housing, within which the apparatus of the invention is lodged, and which is provided with a clamp for each of the two extremities, "beginning" and "end," of the cable, and, further, with two indicator devices, having, say jumping ciphers, on one of which, 52, the cable length is specified in metres by turning the crank 41 and on the other of which, 53 by turning the crank 35, the distance of the fault in metres, as measured from the beginning end of the cable, is determined by turning the crank 35 till the pointer on the instrument 51 registers the mark zero. To work the apparatus, thus, the two clamps have to be joined up with the two ends of the cable, the clamp for connection to the lateral branch being connected to earth. Thereafter, by turning the cranks one after the other, first the length of the cable and then the distance of the fault may be determined, the calculation being now complete. The resistance, the contacts and connections, the battery and the zero-current indicator, are fitted within the box. By pulling out the drawer 57, within which the battery can be located, the operation of replenishing can be readily carried out. By means of the drawer or some other aperture that can be easily closed, the remaining internal parts may also be rendered easily accessible. The internal construction of the apparatus may be, as shown in Fig. 3.

The resistance 2 is spirally wound on the insulating drum 1, which is coupled with shaft 24 by being wound round it and mounted so as to be axially displaceable thereon, while the shaft 24 is journalled at 27 and 13 and is connected with the crank 14. A slide-contact 5 is mounted on a screw 6 and is secured against rotation by means of a roller guide 9, 9, over which is passed an endless band 8. With the help of toothed gears 10, 11, the contact 5 is displaced in such a manner that, as the crank 14 executes a single rotation, it shifts its position on the drum 1 by a distance corresponding to the thread-pitch of the screw; the resistance 2 is, at its one end, connected with a contact ring 3, to which current is fed from the clamp 4 by a brush. The contact 5 is, in its outer-most position, mounted so as to touch the wire. By turning the crank 14, the contact 5 is therefore so displaced as to slide continually on the resistance 2. It thus corresponds completely to the movable contact $d$ of Figure 1 and the crank 14 effects the displacement of the contact 5, in a similar way to the contact $d$. The attachment point 4 corresponds to the point $c$ of Figure 1 and therefore with it, the beginning of the cable and the one clamp of the zero-current indicator are connected.

With the drum 1 engages, when depressed the extremity of a screw 15, which is mounted independently of the drum 1. On the screw is fitted a disc 17 having a boss constructed in the form of a nut which carries the contact 20 on the rod 19. The crank 22 is specially mounted at 23, and is co-axial with the screw 15 and the drum 1. When it is turned it drives the disc 17 with it, by means of a crank 21 and a carrier 16, which passes through a suitable bore in the disc, thus causing the latter to shift its position on the screw-shank 15. The thread-width of the screw 15 is so chosen that the disc 17, as the crank 22 turns once, shifts its position to the left by a distance corresponding to the thread-width of the spiral of resistance 2. The contact 20 is also driven along with the disc 17, and therefore moved for one rotation of the crank 22, through a spiral path that corresponds exactly with that of resistance 2. The breadth of the contact 20 is such that it covers a little less than the thread-width of the resistance 2. In whatever position therefore the drum 1 may remain stationary, the contact 20 will steadily slide on the resistance 2, from its initial position, in which it exactly touches the contact ring 3, in such a manner that, in accordance with the number of rotations made by the crank 22, it will mark off a specified distance on the resistance 2 that represents the distance $a$ between the movable contact $e$ of Figure 1 and the initial point $c$. Thus the contact 20 of Figure 3 corresponds precisely to the contact $e$ of Figure 1, and is, thus, connected with one pole of the battery. It may also be constructed in the form of a narrow clamp or elastic contact-ring bound round the drum 1.

On the crank 14 is fixed a toothed wheel 12 which actuates the attached ciphers of the indicator-device for the cable-length while the disc 17 has a toothed rim 18 which drives the jumping ciphers of the indicator device for the length of cable to the fault. The toothed rim 18 could therefore be also connected with the crank 22.

Instead of the galvanometer indicator any other form of zero-current indicating device may be made use of. It need not screw-shanks 64, 78, kept in position by carrisers 76, 82 which, again are, by suitable means, fixedly connected with the housing 58. 75, 116 are special terminal pieces, fixedly screwed on the end of the shanks 64, 78. Sheaths 63 and 79 are revolubly mounted about the shanks 64 and 78. The sheaths are provided with bosses 150, 151 which fit about reduced portions of the shanks 63 and 78, respectively. These sheaths 63, 79 are further provided with worm threads 62, (80) with which meshes worms 61, (81). By rotation of these worms in the one direction or the other, the sheaths are, thus, turned in one direction or other, about the shanks 64, 78, without, however, shifting their positions, axially, when so doing.

Each of the sheaths 63, 79 is provided with a slit 88 leaving an annular space round the shanks, 64 or 78, open. In these open spaces are fitted bosses 65 and 83 on carriers 66 and 84, respectively, which engage with the threads on the shank 64 and 78. Carriers 66 (or 84) are extended through the axial slits 88 (88) of the corresponding sheaths. The cross-section of Figure 9 renders evident the manner in which the shank 78 is enclosed by the boss 83, the latter being embraced by the sheath 79 that leaves adequate play, and shows how the carrier 84 is extended through the slit 88 of the sheaths 79. If, now, the sheath 79 be, by means of the worm actuation 81, 80, rotated round the shank 78, in the one direction or the other, as shown by the arrow in Figure 9, the carrier 84 will also be driven and rotated, in the one direction or the other, as indicated by the arrow in the same figure. Hence the boss 83 will also be turned on the shank 78, and will in consequence, simultaneously be displaced axially on the shank 78, in one direction or another, as indicated by the arrow in Figure 5. The carrier 84 is thus moved in a spiral path (screw-plane). The gradient of the spiral corresponds exactly with that of the spiral coil, in which the resistance wire 2 is wound on the stationary drum 1.

In a precisely similar way, the carrier 66, with the boss 65, is moved on the shank 64, when the sheath 63 is rotated in the one direction or the other by means of the worm gear 61. The carrier 84 (Figures 5, 6) is, at its upper bent extremity, provided with a transverse incision which carries a collector. This collector consists, on one side, of a resiliently constructed, conducting member 85, which, with its broad surface 86, bears against an annular member 87 of conducting material, for example, copper and on the other side, is, while insulated from the member 1, conductively connected with a hooked collector 5.

The terminal hook of the collector 5 is inserted below, as shown in Figure 5, the resistance wire 2 which corresponds to the resistance wire a of Figure 1 which is arranged in spiral channels, with appropriate tension, and lifts it a little from the bottom of the channel, thus causing the wire, as the result of its mechanical tension, to be pressed hard against the hook, so that a good contact is made. In this way, a minimum of electric resistance is assured for the feed of current from the ring 87 to the resistance wire 2.

The ring 87 is connected by means of a conductor with the clamp 108 for one end of the cable corresponding to the movable contact $d$ of Figure 1. This clamp 108 is shown in Figure 7 in its right position and in Figure 6 in dotted lines in an elevated position for a better understanding of this figure. The contact 20, Figures 5 and 6, corresponds to the movable contact $e$ of Figure 1. The carrier 66 is, at its upper bent end, connected with an intermediate member 74 (Figures 5 and 6) which also carries, at its extremity, a hook shaped contact 20, inserted beneath the resistance wire 2, for reducing the resistance to a minimum. The flow of current to the collector 20 is effected by the conducting member 74 which is insulatedly secured to the bent end of the carrier 66, by means of an insulated conductor 73 (Figures 5 and 6) which branches at its other end into two insulated conductors 89 (Figures 6 and 10) arranged in parallel, which are connected in full contact with a split resilient current collector ring 69, which in its turn is mounted on a conductor ring 68.

The conveyance of the current to the conductor ring 68 is effected by means of the cable 67, Figures 5, 6, 10.

An insulating block 70 is attached to the split ring 69. A latch pin 71 is carried by the block 70 and the end of the pin enters a hole 72 in the bracket 66. When the bracket 66 is rotated, it moves the ring 69 by means of the pin 71 and block 70. A guide-piece 152 for the block 70 and the ring 69 is constructed of suitable insulating material.

The fixed conductor ring 68, Figures 5, 6, 10, is mounted tightly on an insulating member 153 (Figure 5), which latter in its turn is tightly mounted on the boss 77. The insulated wire 67 which conducts the current to the fixed conductor ring 68, passes outwards by means of a hole in the spindle 64.

One end of the resistance wire 2 is positively connected with an insulated wire 90 (Figures 5, 6) which is conducted outwardly likewise through apertures in the boss 77 and the spindles 64 to the clip 109 shown in proper position in Figure 7 and in dotted lines and in an elevated position for a better understanding of Figure 6.

possess any graduated scale but is required to indicate only the zero position.

Of course, in the switching arrangement, the battery may be exchanged with the galvanometer, and may be cut out by a switch or by one of the cranks through axial displacement.

Instead of the cable, a known and an unknown resistance might be attached, one behind the other, to the contacts $c$, $d$, (Figure 1) or 4, 5, (Figure 3) and the junction positions of the two resistances with each other, either connected to earth or connected directly with the pole of the battery. If then, by rotating the crank, any length such as, say, 100 metres, be adjusted instead of the cable length, and the crank 22 be then, turned till the indicator device registers the mark, the ratio of the known and unknown resistances may be immediately determined. In the same way, without altering the construction or internal switching of the apparatus, it may be employed for the comparison of two other magnitudes with each other.

Figure 4 represents a further constructional form of the invention wherein the drum 1 is stationary and the current collector 40, 46 of which 40 corresponds to the contact $e$ and 46 to the contact $d$ in the switch arrangement according to Figure 1, are displaced, on the drum, along the spirally wound resistance wire 2.

For the movement of the two current collectors 40, 46, driving devices similar in principle to those employed for the motion of the current collectors 20 and 5 in the constructional form of Figure 3, are made use of.

The drum 1, consisting of insulating material, is fixed on the screw-shanks 29, 30 which are stationary within the housing. The crank 41 for adjusting a resistance length to correspond to the length of the cable, is mounted, at 49, in the housing (for instance, 58, of Figure 2) and, by means of the toothed wheels, drives the carrier 44 connected with the wheel 43.

The toothed wheel 43 is mounted in the housing. The carrier 44 can set the disc 31 in rotation, the latter being thus displaced to the right or the left, on the screw-shank 29, according to the direction of rotation of the crank 41. By this means, the carrier 45 for the current-collector 46, is also turned, and, at the same time, displaced to the right or left. The thread-width of the screw 29 is chosen of the same magnitude as that of the spiral windings of the resistance 2 on the drum 1, so that the current-collector 46, in its motion, is guided steadily on the resistance wire 2.

The drive for the current-collector 40 is similarly effected, the latter being, by means of the carrier 39, carried and moved by the crank 35 mounted at 50 in the housing 58 and through the intermediary of the toothed wheels 36, 37, the carrier 38 on the wheel 37 and the disc 32 which is displaceable on the screw-shank 30. 48 denotes the bearing for the toothed wheel 37. The screw 30 has the same gradient as the spiral turns of the resistance wire 2.

The current-collectors 40, 46 are constructed in the form of rotary discs to prevent as far as possible the wear of the resistance wire and to guarantee a steadily satisfactory contact.

The toothed rim 33, on the disc 31, drives a recording mechanism on which the length of the adjusted cable may be read, while the toothed rim 34 on the disc 32 drives a similar mechanism which allows of the distance of the position of the fault from the end of the cable, being read.

The method of operation of this constructional form is as follows:—

With the contact 4, which, for example, is connected by a ring 28 to the commencement of the resistance wire 2, the clamp for the commencing end of the cable is connected: the current collector 40 is connected with the one pole of the battery, the other end of which is earthed, the current-tap 46 is connected with the clamp for the end extremity of the cable. Further, the zero-current indicator is joined up with the collectors 4 and 46. The crank 41 is then, first, turned until the registering mechanism is adjusted for the known length of cable which is electrically connected to contacts 4 and 46 and indicates this length, in the proper scale on the resistance wire 2 between these two current-collectors 4 and 46.

By means of a contact, the connection between collector 40 and the pole of the battery may then be, conveniently, established, and then crank 35 is turned so far that the zero-current indicator registers the index zero. The collector 40 must then be situated at some position on the resistance wire 2, lying between the slide-ring 28 and the collector 46. The position of the collector 40, for which the indicator registers zero, is that for which the distance of the collector 40 from the beginning of the resistance wire 2, as measured on the latter in the proper scale, represents the distance from the beginning of the cable, of the position of the fault in the latter. The recording mechanism connected with the disc 32 by the gear teeth 34, then immediately enables the distance of the locality of the fault to be read.

A specially advantageous constructional form of the invention is represented in Figures 5–10. Figures 8, 9 and 10 represent details. A stationary drum 1, of insulating material is again arranged, which, by means of spokes or the like, 117, is connected with the boss 77, the latter being, in turn fixedly screwed to the ends of two stationary The connecting point of the wire 90 with the resistance wire 2 corresponds to the point c of Figure 1.

The movable contact 20 is attached over the conducting piece 74, conductor 73, branches 89, split ring 69, collector ring 68, conductor 67, clamp 98, insulated conductor, branching point (Figure 6), conductor 99, conductor 154 (Figure 6), with a terminal of a switch 96, the other contact of which is attached by means of a conductor 200 with a terminal or pole 107 of a battery 97, the other terminal or pole 106 thereof being connected by the conductor 105 with the clamp 104 shown in correct position as in Figures 6 and 7, the clamp 104 being designed for a connection to earth in any suitable manner.

The conducting contact ring 87 (Figures 5, 6) which connects, through the intermediate conducting pieces 86, 85 to the brush 5, is connected in the previously described manner by means of the conductor 6 with the terminal 108 on the exterior wall of the housing 58 (Figure 7), which terminal is connected to an end of the cable.

Furthermore, the same conducting ring 87 is connected in the interior of the housing by means of the conductor 103 to one terminal of the galvanometer 94 for indicating zero current, while its other terminal leads over a line 102 to a contact of a switch 95, whose movable portion is connected over another terminal with the line 190 leading to the conductor 90 which is connected on one hand with the beginning of the resistance wire 2 and on the other side leads to the terminal 109 as described before.

The batteries 97 are placed in a special portion 112 of the housing in front of which there lies a detachable lid 160, Figure 6, so that the batteries can be easily exchanged.

The instrument 94 for indicating the zero neutral current is placed in a special portion 113 of the housing in front of which the detachable lid 161 lies, so that in the event of any injury the instrument can easily be exchanged.

The earth terminal 104 and the terminal for the cable end 108 and the terminal for the beginning of the cable 109 are likewise mounted in a detachable lid 110, Figures 6, 7.

The worm 81, Figures 5, 6, is mounted on a shaft 60, which is held in bearings in the housing 58 and is fitted on the outside thereof with a crank 22.

This crank shaft 60 is connected with gear wheels 92 to drive the spring recording mechanism.

In similar fashion the worm 81 is actuated by means of a crankshaft, which leads to a crank 14 outside the receptacle, Figure 7, the crankshaft of which drives a second recording mechanism by means of connecting series of gear wheels 91 (Figure 5). The figures recorded may be read through inspection apertures 52, 53 in the housing (Figure 2). There is provided an inspection aperture for the instrument for recording zero current as is indicated in 51 of Figure 2, on the same surface or side of the housing as the recording mechanism.

The apparatus is employed in the following manner:—

After connection with earth has been effected through closing the terminal 104 Figure 7 the terminal 108 is connected with the end of one cable or the insulated transmission wire which is to be examined, and terminal 109 with the other end of the cable or wire. Crank 14 is turned until the recording mechanism registers the known length of the conductor being tested. Switches 95 and 96 are closed. Simultaneously with the turning of this crank, the push button or switch 95 is continuously or temporarily connected thus bringing also the zero instrument into connection. The crank 22 is turned in one or the other direction until zero is indicated, and then the indicating device connected with the crank shaft 22 registers the distance of the place where the flaw is from the beginning or end of the cable in metres or fractional parts thereof, and it is hereby apparent how extremely simple, on account of the properly conducting connections within the apparatus, it becomes to determine exactly the spot where a flaw has occurred, even though an extremely weak source of current be employed, without it being requisite that the operator should possess any special electro-technical knowledge. Of course, without making any alteration in the construction of the apparatus or its mode of employment, the connection may be varied in such a manner that the instrument for detecting zero current and the battery in the principal connection may change places with one another.

The apparatus above described is not limited to the use of detecting of faults in cables or wires. The apparatus comprising the invention can be used also for other purposes, for instance for measuring the value of electric resistances by alternating or direct current, further for measuring the values of capacities and electric insulations. The methods for connecting of the resistances, capacities or insulations, which are to be measured and of the resistances, capacities or insulations of a known value which with the first said resistances etc. are to be compared are well known in connection with the use of a Wheatstone-bridge.

While I have herein shown and described one specific embodiment of my invention for illustrative purposes and have disclosed and discussed in detail the construction and arrangement incident to one specific application thereof, it is to be understood that the invention is not limited to the detail or relative arrangement of the parts, but that it is capable of numerous modifications either in entirety or in the different sub-combinations thereof without departing from the spirit of the claims.

Having thus described my invention, what I claim as new, and desire to secure by Letters Patent, is—

1. In apparatus constructed in accordance with the principle of the Wheatstone bridge, a resistance element, a terminal connected to one end of said element and adapted to be connected to one end of a conductor under investigation, a movable contact adapted to connect the other end of the conductor under investigation to a variable point on said element, an indicator connected to said movable contact and adapted to show figures corresponding to the length of the conductor under investigation when the connected contact is positioned so that the length of the element between the contact and the terminal has a selected ratio to the length of the conductor being investigated, a crank to operate simultaneously the said movable contact and said indicator, said indicator comprising several series of digits, said series being side by side, a second contact movable along said element between the first said contact and the terminal, connections whereby it may be ascertained when the second said movable contact divides the distance between the first said contact and the terminal proportionately to the position of a fault in the conductor between the ends of said conductor, and an indicating device connected to the second said movable conductor and adapted to indicate a length, which bears the same ratio to the distance between the connected movable contact and the terminal, that the length indicated by the first said indicator bears to the distance of its connected contact from the terminal, a second crank to operate simultaneously said second movable contact and said second indicator, said second indicator also comprising several series of digits, said series being side by side.

2. A device for measuring values of cables and conductors, said device operating on the Wheatstone bridge principle and comprising a resistance, a movable contact slidable on said resistance continuously thereon and connected with one end of the bridge, several series of movable numerals, said series being side by side and a single means for sliding said contact along said resistance and for simultaneously presenting a member on a numeral indicator, whereby the desired value is directly indicated.

3. A device for measuring values of cables and conductors, said device operating on the Wheatstone bridge principle and comprising a resistance, a movable contact slidable on said resistance and connected with one end of the bridge, a second movable contact sliding on said resistance and adapted to be connected with one end of the cable or conductor, two objective indicators, a single means for sliding said first-mentioned contact along said resistance and for simultaneously actuating an objective indicator, and a single means for sliding said second-mentioned contact along said resistance and for simultaneously operating the other objective indicator, each indicator comprising several series of digits, said series being side by side, whereby the value sought can be directly read.

4. A device for measuring values of cables and conductors, said device operating on the Wheatstone bridge principle and comprising a resistance, a movable contact slidable on said resistance and connected with one end of the bridge, a second movable contact sliding on said resistance and adapted to be connected with one end of the cable or conductor, two numeral indicators, a crank means for sliding said first-mentioned contact along said resistance and for simultaneously presenting a numeral of one numeral indicator, and another crank means for sliding said second mentioned contact along said resistance and for simultaneously presenting a numeral of the other numeral indicator.

5. A device for measuring values of cables and conductors, said device operating on the Wheatstone bridge principle and comprising a resistance, a movable contact slidable on said resistance and connected with one end of the bridge, a second movable contact sliding on said resistance and adapted to be connected with one end of the cable or conductor, two numeral indicators, a box containing all of said parts, two cranks outside said box and passing therethrough, one of said crank being adapted to slide said first-mentioned contact along said resistance and to simultaneously present a numeral of one numeral indicator, and the other crank being adapted to slide said second-mentioned contact along said resistance and to simultaneously present a numeral of the other numeral indicator, and windows in said box over both presented numerals.

DR. VICTOR PLANER.